United States Patent [19]

Davis

[11] Patent Number: 5,383,060
[45] Date of Patent: Jan. 17, 1995

[54] DYNAMIC COMPENSATING LASER TELESCOPE APPARATUS

[75] Inventor: Stephen E. Davis, Apopka, Fla.

[73] Assignee: Litton Systems, Inc., Beverly Hills, Calif.

[21] Appl. No.: 979,337

[22] Filed: Nov. 20, 1992

[51] Int. Cl.$^6$ .................. G02B 7/02; G02B 15/14; G02B 23/00

[52] U.S. Cl. .................. 359/820; 359/399; 359/694; 359/819

[58] Field of Search .............. 359/399, 406, 425, 426, 359/694, 696, 823, 710, 808, 811, 819, 820, 894; 372/33, 34, 101, 107, 65

[56] References Cited

U.S. PATENT DOCUMENTS

| | | | |
|---|---|---|---|
| 4,065,207 | 12/1977 | Zavitsanos et al. | 359/886 |
| 4,083,057 | 4/1978 | Quinn | 359/698 |
| 4,639,083 | 1/1987 | Fuziwara et al. | 359/698 |
| 4,771,437 | 9/1988 | Powell et al. | 372/107 |
| 4,885,600 | 12/1989 | Iwasa et al. | 359/823 |
| 4,949,358 | 8/1990 | Kantorski et al. | 372/94 |
| 4,972,033 | 9/1984 | Fukuhara et al. | 359/698 |
| 5,001,718 | 3/1991 | Burrows et al. | 372/33 |

Primary Examiner—Loha Ben
Assistant Examiner—Thong Nguyen
Attorney, Agent, or Firm—William M. Hobby, III

[57] ABSTRACT

A laser telescope is provided for reducing undesired laser thermal lensing effects which would otherwise impair the intensity and quality of a laser beam passing therethrough. An outer barrel is mounted in a chamber within a housing by ball bearings which hold the outer barrel longitudinally fixed but permits rotation of the outer barrel about its longitudinal axis. An inner barrel is coaxially situated within the outer barrel and includes a threaded outer surface which is threaded into a threaded inner surface of the outer barrel. A first lens is mounted adjacent one end of the chamber and a second lens is mounted in the inner barrel. A laser beam is directed through the laser telescope along the common axis of the chamber, the outer barrel, and the inner barrel. The lens spacing in the barrels is sensed and actuates a drive motor in proportion to the error between the sensed lens spacing and the desired lens spacing. The distance between the first and second lenses is varied in response to the error signals to adjust the focus of the laser beam to minimize thermal lensing effects.

15 Claims, 1 Drawing Sheet

DYNAMIC COMPENSATING LASER TELESCOPE APPARATUS

BACKGROUND OF THE INVENTION

This invention relates in general to lasers and, more particularly, to a laser apparatus including a telescoping movable lens structure which can be focussed to compensate for undesired thermal lensing effects.

It is generally desirable that the output beam of a laser exhibit controlled divergence and high quality in applications such as laser rangefinding, target designation, laser drilling, laser cutting, laser welding and the like. However, this is often difficult to achieve due to undesired effects related to the dissipation of power in the laser rod. For example, thermal focal lensing, thermally dependent rod end curvature and birefringence of the rod all affect the rod focal length. These power dependent effects cause the uncompensated output beam quality to be power dependent.

Lasers invariably include an optical element or material which is the lasing medium. This medium receives energy from an external source such as flash lamps, for example. Most of the energy applied to the medium is dissipated as heat to external cooling devices or fluids. This heat transfer results in thermal gradients within the lasing medium with higher temperatures at the center of the medium than at the exterior surfaces of the medium. These thermal gradients result in thermal lensing effects due to the combination of thermal expansion and stress birefringence. An example of this can be seen using a cylindrical rod-shaped lasing medium which is cooled on its outside diameter. In this case, the temperature distribution in the rod cross section is parabolic with a peak at the center dependent on power input and heat transfer coefficients. Thus, the higher thermal expansion at the rod centerline and the resulting shear stress manifested as stress birefringence cause the rod to behave as a positive lens.

If no compensation is made for the thermally induced lens or thermal lensing, the divergence of the laser output beam varies with input power and will also vary during the start-up period while the steady state gradient is being established. In other words, thermal lensing is power and time dependent. It is known in the art to place additional optical elements in the path of the laser beam to compensate for this undesired effect and therefore achieve increased collimation.

One approach which has been employed to compensate for laser thermal lensing is to position a two lens telescope in the laser beam path. The spacing between the two lenses is made to be dynamically variable. At start-up and as the output beam power and the power dissipated in the laser active element correspondingly vary, so too is the spacing between the two lenses varied to compensate for thermally induced variation in the focal length of the laser active element. The time programmed motion of the telescope and steady state positions at various power levels are controlled by external electronics which are programmed based on empirical and analytical data.

Prior U.S. patents which employ such a telescoping lens arrangement to compensate a laser for thermal lensing include U.S. Pat. No. 4,949,358 issued to Kantorski et al. and U.S. Pat. No. 5,001,718 issued to Burrows et al. Kantorski et al. employ both a telescope to compensate their laser for thermal lensing and a polarization rotator to ameliorate undesired birefringence effects. Burrows et al. employ a linear stepper motor in a feedback loop to adjust the distance between the lenses of their telescope to minimize thermal lensing.

U.S. Pat. No. 4,065,207 issued to Zavitsanos et al. discloses a programmable power attenuator for lasers wherein a motor drives a screw to change the position of an inner cylinder within an outer cylinder. As the inner cylinder changes position, the size of an absorptive cell within the attenuator correspondingly changes. The absorptive cell is filled with a gas which absorbs the energy of the laser beam passing therethrough. A variable length path is thus provided to the incident laser beam such that the intensity of the beam can be attenuated according to the particular path length which is selected using the stepper motor. The screw which drives the inner cylinder back and forth is separated from the inner and outer cylinders. The Zavitsanos et al. patent does not address the problem of laser thermal lensing but rather is directed toward laser power attenuation.

SUMMARY OF THE INVENTION

One object of the present invention is to provide a laser apparatus which compensates for laser thermal lensing.

Another object of the present invention is to provide precise linear movement to a telescope in a laser apparatus which compensates for laser thermal lensing.

Yet another object of the present invention is to provide an apparatus which compensates for laser thermal lensing and which is operative over an extreme temperature range.

Still another object of the present invention is to provide a telescope in a laser apparatus to minimize thermal lensing and which generates a minimum number of particles when in motion.

In accordance with the present invention, a laser telescope apparatus for reducing laser thermal lensing is provided. The telescope apparatus includes a housing having a chamber with opposed ends. An outer barrel is situated in the chamber and includes a threaded inner surface. The outer barrel exhibits a longitudinal axis. A mounting structure is connected to the housing and the outer barrel to mount the outer barrel in the chamber. The mounting structure permits rotation of the outer barrel about the longitudinal axis while holding the outer barrel fixed with respect to motion parallel with the longitudinal axis. An inner barrel is movably positioned within the outer barrel and includes a threaded outer surface which is threaded into the threaded inner surface of the outer barrel. The outer barrel and the inner barrel are coaxially located about the longitudinal axis. A first lens is mounted adjacent one end of the chamber and a second lens is mounted in the inner barrel. A laser light source generates a laser beam which is directed along the longitudinal axis. A motor is mechanically coupled to the outer barrel to rotate the outer barrel in response to a signal to cause the inner barrel to move longitudinally by the threading action of the outer barrel with respect to the inner barrel. In this manner, the distance between the first and second lenses is varied to adjust the focus of the laser beam in response to the signal.

BRIEF DESCRIPTION OF THE DRAWINGS

The features of the invention believed to be novel are specifically set forth in the appended claims. However, the invention itself, both as to its structure and method of operation, may best be understood by referring to the following description and the accompanying drawings.

DETAILED DESCRIPTION OF THE INVENTION

Figure 1:
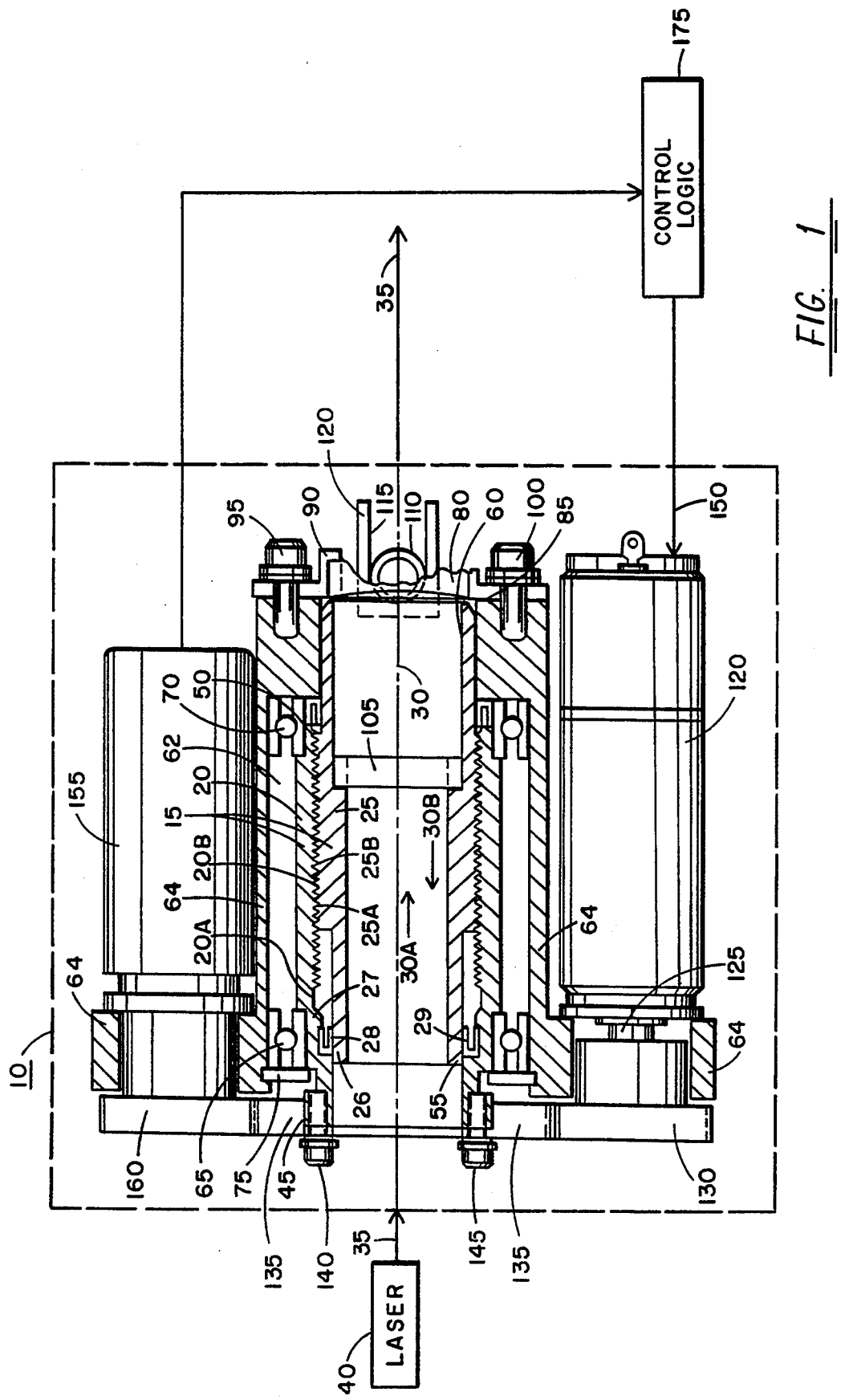
FIG. 1 is a cross sectional view of the laser telescope apparatus of the present invention.

FIG. 1 shows the laser telescope apparatus of the present invention as laser telescope apparatus 10. Laser telescope apparatus 10 includes a barrel assembly 15 having an outer barrel 20 and an inner barrel 25 which are substantially cylindrical. In this embodiment of the invention, outer barrel 20 is fabricated from titanium and inner barrel 25 is fabricated from stainless steel. A 440 C type alloy of stainless steel is acceptable for use as outer barrel 20.

Outer barrel 20 and inner barrel 25 are coaxially mounted about a common longitudinal axis 30. Outer barrel 20 includes an inner surface 20A, a portion of which is threaded and which is designated as threaded surface 20B. Inner barrel 25 includes an outer surface 25A, a portion of which is threaded and which is designated as threaded surface 25B. Threaded surface 25B of inner barrel 25 mates with and screws into threaded surface 20B of outer barrel 20 as shown in FIG. 1. Inner barrel 25 includes a neck portion 26 which is sealed within a collar portion 27 of outer barrel 20 by Teflon seals 28 and 29. (Teflon is a trademark of DuPont.) Outer barrel 20 and inner barrel 25 are hollow structures such that a laser beam 35 from a laser light source 40 can pass therethrough as illustrated.

Outer barrel 20 includes opposed ends 45 and 50. Inner barrel 25 includes opposed ends 55 and 60. Barrel assembly 15 is situated within a substantially cylindrical chamber 62 within a titanium housing 64. More particularly, stainless steel ball bearings 65 and 70 are respectively situated adjacent ends 45 and 50 of outer barrel 20 to hold outer barrel 20 in a longitudinally fixed position while permitting outer barrel 20 to freely rotate about axis 30. Barrel assembly 15 and ball bearings 65 and 70 are held in position within chamber 62 by a bowed retaining ring 75 which also provides bearing preload.

Since threaded surfaces 20B and 25B are mated with each other, whenever outer barrel 20 is rotated, inner barrel is caused to move longitudinally along axis 30, either in direction 30A or direction 30B depending on the direction of rotation of outer barrel 20. It is helpful at this point to refer to outer barrel 20 as the "drive barrel" because outer barrel 20 is longitudinally held in a fixed position while being capable of rotating about axis 30 to drive inner barrel 25 (the "driven barrel") longitudinally back and forth.

In this particular embodiment of the invention, a focussing lens 80 is situated in a fixed position at housing end 85 by a lens mount 90 which is bolted to housing end 85 by bolts 95 and 100. Another focussing lens 105 is mounted within inner barrel 25 (the driven barrel) as shown. Both lenses 80 and 105 are coaxially aligned with axis 30. In this particular embodiment, lens 80 is concave and lens 105 is convex.

Housing 64 mounts on a small ball bearing 110 which engages a slot 115 in a U-shaped guide member 120 extending from inner barrel 25. In this manner, inner barrel 25 (the driven barrel) is prevented from rotating when driven by outer barrel 20 (the drive barrel). In the above described apparatus, it is noted that outer barrel 20 rotates but does not move longitudinally whereas inner barrel 25 moves longitudinally but does not rotate.

To move outer barrel 20 clockwise and counterclockwise, a servo-motor 120 is mechanically coupled to outer barrel 20 in the following manner. Motor 120 is fixedly attached to housing 64. A drive axle 125 on motor 120 is coupled to an anti-backlash gear 130 as shown in FIG. 1. A spur gear 135 is connected to outer barrel 20 at end 45 by bolts 140 and 145. When a signal is provided to a signal input 150 of motor 120, gear 130 turns a specified amount and direction in accordance with such signal. The rotation of gear 130 causes gear 135 and outer barrel 20 also to rotate. The rotation of outer barrel 20 causes inner barrel 25 and lens 105 therein to move longitudinally.

To sense the position of lens 105 with respect to lens 80 (that is, the spacing therebetween), a potentiometer 155 is coupled to gear 135 by an anti-backlash gear 160. In this particular embodiment, a ten turn potentiometer is employed. As outer barrel 20 and inner barrel 25 move under the drive of motor 120, potentiometer 155 correspondingly rotates. The change in resistance exhibited by potentiometer 155 is thus proportional to the amount of longitudinal travel of inner barrel 25 and lens 105.

Control logic 175 is coupled to potentiometer 155 such that control logic 175 is continually updated with information with respect to the position of lens 105, that is, the inter-lens spacing between lens 105 and lens 80. More specifically, control logic 175 uses the laser beam output power setting, a programmed time vs. motion algorithm and lens position information from the potentiometer 155 to provide a control signal to motor 120 which positions lens 105 with the appropriate spacing from lens 80. A feedback loop is thus established which minimizes the effects of undesired laser lensing to maximize laser output beam quality.

The foregoing describes a dynamic compensating laser telescope apparatus for a laser system which minimizes the undesired effect of laser thermal lensing to maximize laser output beam quality. The laser telescopic laser apparatus exhibits a precise linear movement and is operative over an wide temperature range. Moreover, the laser telescope apparatus minimizes the number of undesired particles which are generated as it operates.

While only certain preferred features of the invention have been shown by way of illustration, many modifications and changes will occur to those skilled in the art. It is, therefore, to be understood that the present claims are intended to cover all such modifications and changes which fall within the true spirit of the invention.

I claim:

1. A laser telescope apparatus for reducing laser thermal lensing effects comprising:

a housing including a chamber with opposed ends;

an outer barrel having two opposed ends situated in said chamber and including a threaded inner surface, said outer barrel exhibiting a longitudinal axis;

mounting means, connected to said housing and said outer barrel, for mounting said outer barrel in said chamber to permit rotation of said outer barrel about said longitudinal axis while holding said outer barrel fixed with respect to motion parallel with said longitudinal axis;

an inner barrel movably positioned within said outer barrel and including a threaded outer surface threaded into the threaded inner surface of said outer barrel, said outer barrel and said inner barrel being coaxially located about said longitudinal axis;

a first lens mounted adjacent one end of said chamber;

a second lens mounted in said inner barrel;

a laser light source for generating a laser beam which is directed along said longitudinal axis, and a motor mechanically coupled to said outer barrel to rotate said outer barrel in response to a signal to cause said inner barrel to move longitudinally by the threading action of said outer barrel with respect to said inner barrel, whereby the distance between said first and second lenses is varied to adjust the focus of said laser beam in response to said signal.

2. The laser telescope apparatus of claim 1 wherein said mounting means comprises first and second ball bearings situated adjacent the opposed ends of said outer barrel.

3. The laser telescope apparatus of claim 1 further comprising an outer barrel gear coaxially connected to one end of said outer barrel.

4. The laser telescope apparatus of claim 3 further comprising a first anti-backlash gear coupled to said motor and said outer barrel gear to permit said motor to drive said outer barrel.

5. The laser telescope apparatus of claim 3 further comprising sensing means coupled to said outer barrel gear for sensing the position of the second lens in said inner barrel.

6. The laser telescope apparatus of claim 5 wherein said sensing means includes a second anti-backlash gear coupled to said outer barrel gear such that said second anti-backlash gear rotates when said outer barrel gear rotates, and a potentiometer mechanically coupled to said second anti-backlash gear such that said second anti-backlash gear drives said potentiometer to cause the resistance of said potentiometer to vary as said outer barrel gear rotates and as the second lens in said inner barrel moves longitudinally.

7. The laser telescope apparatus of claim 1 wherein said chamber in said housing is substantially cylindrical.

8. The laser telescope apparatus of claim 1 further comprising rotation preventing means, coupled to said inner barrel, for preventing rotation of said inner barrel when said outer barrel drives said inner barrel.

9. A laser telescope apparatus for reducing thermal laser lensing comprising:

a housing including a chamber with opposed ends;

an outer barrel having two opposed ends situated in said chamber and including a threaded inner surface, said outer barrel exhibiting a longitudinal axis;

mounting means, connected to said housing and said outer barrel, for mounting said outer barrel in said chamber to permit rotation of said outer barrel about said longitudinal axis while holding said outer barrel fixed with respect to motion parallel with said longitudinal axis, said mounting means having first and second ball bearings situated adjacent the opposed ends of said outer barrel;

an inner barrel movably positioned within said outer barrel and including a threaded outer surface threaded into the threaded inner surface of said outer barrel, said outer barrel and said inner barrel being coaxially located about said longitudinal axis;

a first lens mounted adjacent one end of said chamber;

a second lens mounted in said inner barrel;

a laser light source for generating a laser beam which is directed along said longitudinal axis; and a motor mechanically coupled to said outer barrel to rotate said outer barrel in response to a signal to cause said inner barrel to move longitudinally by the threading action of said outer barrel with respect to said inner barrel, whereby the distance between said first and second lenses is varied in response to said signal to adjust the focus of a laser beam which is propagated along said longitudinal axis.

10. The laser telescope apparatus of claim 9 further comprising an outer barrel gear coaxially connected to one end of said outer barrel.

11. The laser telescope apparatus of claim 10 further comprising a first anti-backlash gear coupled to said motor and said outer barrel gear to permit said motor to drive said outer barrel.

12. The laser telescope apparatus of claim 9 wherein said chamber in said housing is substantially cylindrical.

13. The laser telescope apparatus of claim 9 further comprising sensing means coupled to said outer barrel gear for sensing the position of the second lens in said inner barrel.

14. The laser telescope apparatus of claim 13 wherein said sensing means includes a second anti-backlash gear coupled to said outer barrel gear such that said second anti-backlash gear rotates when said outer barrel gear rotates, and a potentiometer mechanically coupled to said second anti-backlash gear such that said second anti-backlash gear drives said potentiometer to cause the resistance of said potentiometer to vary as said outer barrel gear rotates and as the second lens in said inner barrel moves longitudinally.

15. The laser telescope apparatus of claim 9 further comprising rotation preventing means, coupled to said inner barrel, for preventing rotation of said inner barrel when said outer barrel drives said inner barrel.

* * * * *